(12) United States Patent
Staab et al.

(10) Patent No.: US 7,448,924 B2
(45) Date of Patent: Nov. 11, 2008

(54) CURRENT DISTRIBUTION BUS

(75) Inventors: Christian Staab, Remscheid (DE); Joachim Bock, Wuppertal (DE); Frank Ochse, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 63 days.

(21) Appl. No.: 11/543,604

(22) Filed: Oct. 5, 2006

(65) Prior Publication Data

US 2007/0082527 A1     Apr. 12, 2007

(51) Int. Cl.
H01R 4/10        (2006.01)
(52) U.S. Cl. ...................... 439/880; 439/210
(58) Field of Classification Search ............... 439/880, 439/882, 877, 210
See application file for complete search history.

(56) References Cited

U.S. PATENT DOCUMENTS

| | | | | |
|---|---|---|---|---|
| 1,491,838 A | * | 4/1924 | Zimmerman | ............... 439/868 |
| 1,886,086 A | * | 11/1932 | Damon | ................ 403/185 |
| 2,038,535 A | * | 4/1936 | Brenizer | ................ 29/459 |
| 2,427,518 A | * | 9/1947 | Bergan | ................ 439/880 |
| 3,320,356 A | * | 5/1967 | Kirwin | ................ 174/94 R |
| 4,976,627 A | * | 12/1990 | O'Loughlin | ............ 439/100 |
| 5,051,543 A | * | 9/1991 | McGuire | ................ 174/78 |
| 5,422,438 A | * | 6/1995 | Lamome | ................ 174/84 C |
| 6,641,444 B2 | * | 11/2003 | Hanazaki et al. | ........... 439/877 |

FOREIGN PATENT DOCUMENTS

DE     19646264.9     9/1996

* cited by examiner

Primary Examiner—Gary F. Paumen
(74) Attorney, Agent, or Firm—David P. Wood

(57) ABSTRACT

A current distribution bus comprises an electrically conductive conduit which has been brought into a flattened shape at least regionally by pressing and whose end sections are made in sleeve shape for the connection of electrical leads.

10 Claims, 2 Drawing Sheets

CURRENT DISTRIBUTION BUS

TECHNICAL FIELD

The invention relates to a current distribution bus for use in motor vehicles. Current distribution buses of this type are generally known and serve inter alia the reception of main fuses which protect a wire harness in a motor vehicle.

BACKGROUND OF THE INVENTION

It is, however, a disadvantage with the known current distribution buses that they are produced as stamped sheet metal bending members, since their manufacture is very complex and/or expensive and the corresponding stamping tools have to be converted or replaced even with slight changes to the size and/or shape of the stamped current distribution buses. Furthermore, unwanted material waste arises due to the stamping.

It is furthermore disadvantageous that a lot of space is required in the available harness space of the motor vehicle for the connection of electrical leads to the current distribution bus when open crimp barrels are used. This also makes the fitting of the current distribution bus in the motor vehicle more difficult.

SUMMARY OF THE INVENTION

It is the underlying object of the invention to provide a current distribution bus which is cost favorable and permits simple installation. At the same time, a reliable and secure function should be ensured.

This object is satisfied by the features of claim 1.

Provision is made with the current distribution bus in accordance with the invention for it to comprise an electrically conductive conduit which has been brought into a flattened shape at least regionally by pressing. The end sections of the current distribution bus are made in sleeve shape for the connection of electrical leads.

The current distribution bus in accordance with the invention is above all characterized in that the starting material can be a commercial electrically conductive conduit. The current distribution bus is given a substantially rectangular cross-section with high mechanical stability by the pressing of the conduit. A further advantage of the current distributor bus in accordance with the invention consists of the fact that it is possible to react fast and in an cost favorable manner to the individual needs of the customers with respect to the geometry of the current distributor bus, in particular with respect to the shape and/or size, since no stamped tools have to be converted or replaced. Furthermore, in contrast to the manufacture of a stamped current distributor bus, no material waste is incurred in the manufacture of the current distribution bus in accordance with the invention, which contributes to a further reduction in the manufacturing costs.

The current distribution bus in accordance with the invention is furthermore characterized in that a closed crimp barrel design is present due to the sleeve-like design of the end sections which requires less space in the installation space of the motor vehicle during crimping than the usually used open barrel design. The end sections can, for example, be hex crimped or F crimped depending on the demand. Furthermore, increased security in the contacting with the electrical connection lines is achieved by the material addition in the contact region due to the sleeve-like design of the end sections.

Advantageous embodiments of the invention are recited in the dependent claims, in the description and in the drawings.

In accordance with an advantageous embodiment of the invention, the current distribution bus is made of a single electrically conductive conduit, with the latter having been brought into a flattened shape by pressing in a central section without the end sections disposed at both sides of the central section being substantially deformed. The non-deformed end sections are made in sleeve shape and represent a tubular link for the connection of electrical leads in the closed crimp barrel design. A substantial advantage of the current distribution bus made in one piece is the simple and fast manufacture in a few production steps.

In accordance with a further advantageous embodiment, the end sections of the current distributor bus are made as electrically conductive tube pieces which are connected to the conduit by pressing. In this process, the conduit and the tube pieces are pushed into one another and pressed into a flattened shape with one another. An advantage of this embodiment is the possibility of connecting tubes and tube pieces of different diameters with one another to take account of different demands of the customers with respect to the connection of electrical leads. Furthermore, at least one bulge portion can be provided in the common extent of the conduit and of the tube pieces connected to the conduit. This bulge portion can be provided by a not full pressing of the conduit and of the tube pieces with one another. An advantage of a bulge portion of this type consists of the fact that the tube pieces are thereby secured against displacement with respect to the longitudinal axis of the conduit and a release of the connection is prevented.

Provision can be made in both the one-piece embodiments and in the multi-piece embodiments of the current distribution bus in accordance with the invention for them to have at least one contact region in its flattened section which can receive electrical contacts of different types, such as fuses or electrical leads, next to one another along its longitudinal side. These contacts can, for example, be fastened to bores or pressed-in threaded pins at the current distribution bus. Contacts can, however, also be clinched directly to the contact region of the current distribution bus.

It is understood that the shape of the current distribution bus can be matched to the geometrical demands of the installation space of a motor vehicle by combinations of folded edges and bent portions. This applies both to the flattened section and to the sleeve-like end sections of the current distribution bus. The current distribution bus can be held in a plastic housing or be otherwise fastened in the motor vehicle.

BRIEF DESCRIPTION OF THE DRAWINGS

The invention will be described in the following purely by way of example with reference to advantageous embodiments and to the drawings. There are shown.

DESCRIPTION OF THE PREFERRED EMBODIMENT

Figure 1:
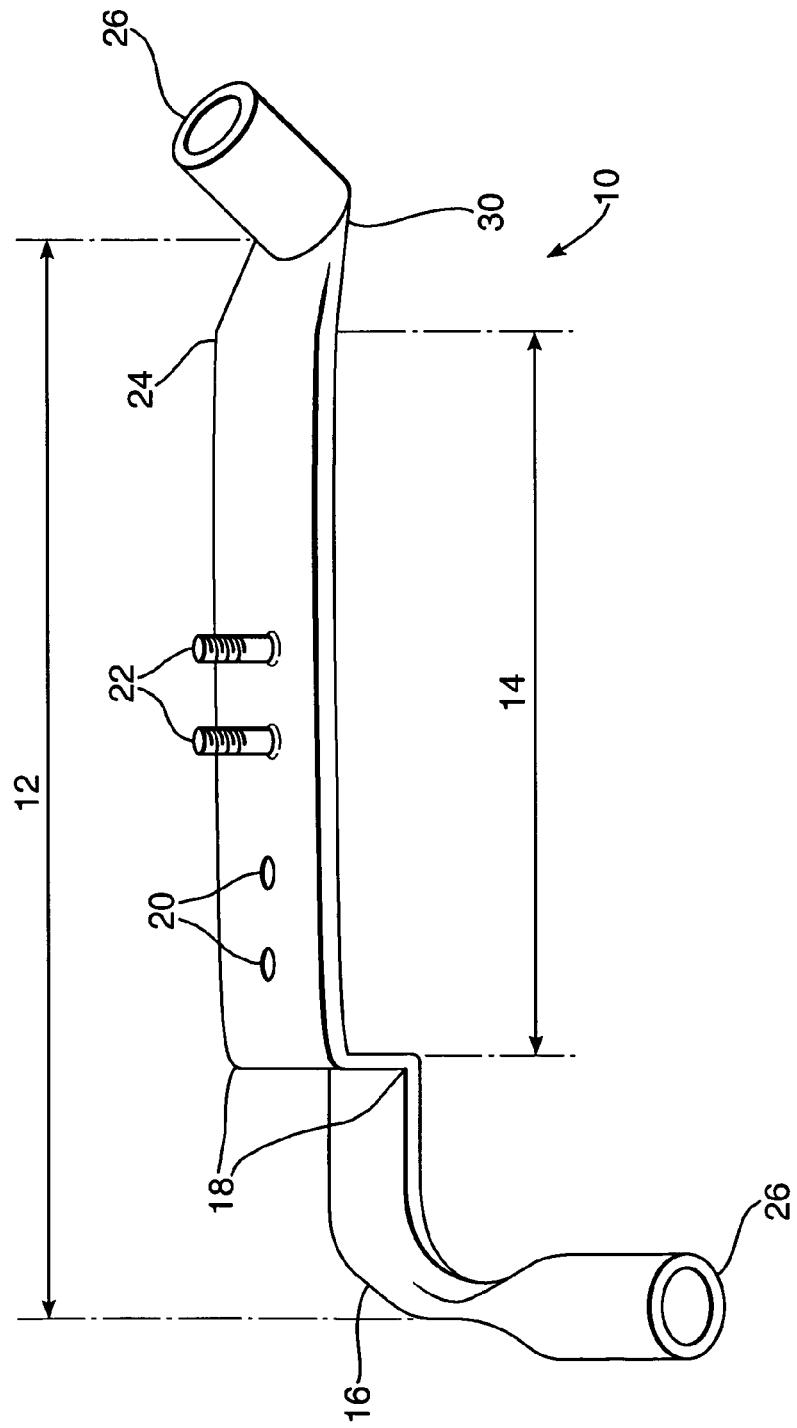
FIG. 1 is a perspective view of an embodiment of a current distribution bus.

FIG. 1 shows a current distribution bus 10 in accordance with the invention made from a single tube for use in motor vehicles comprising a flattened section 12 with a substantially rectangular cross-section in its central region. The flattened section 12 is made by partial pressing of the conduit and is forwardly folded at its left hand end by a bend 16 by approximately 90° in the plane defined by the flattened section 12. The flattened section 12 has a step perpendicular to the aforesaid plane in its extent, said step being caused by two right-angle folded edges 18. A contact region 14 adjoins this step in the further extent of the flattened section 12 and can receive a plurality of electrical contacts next to one another along its longitudinal side. Two bores 20 for the connection of electrical contacts are formed in the contact region 14 in the embodiment shown. Furthermore, two threaded pins 22 are pressed into the contact region 14 which likewise serve the fastening of electrical contacts. A further folded edge 24 adjoins the right hand end of the contact region 14, with the angle between the longitudinal axis of the current distribution bus and the part of the flattened section 12 adjoining the flat folded edge 28 at the right hand side amounting to less than 30°.

The current distributor bus 10 in accordance with the invention furthermore comprises end sections 26 made in sleeve shape at its outer ends and provided for the connection of electrical leads. Electrical leads (not shown) can be guided into the sleeve-like end sections and be fastened to them, for example, by hex crimping or F crimping. A straight end section transition 28 is realized at the left hand end of the current distributor bus 10, i.e. without a folded edge between the sleeve-like end section 26 and the flattened section 12. The right hand end of the current distribution bus 10 has a folded edge 30 of the end section 26 which includes an angle of approximately 120° between the right hand end of the flattened section 12 and the sleeve-like end section 26.

For the manufacture of the current distribution bus 10 described above, a partial piece of a straight and electrically conductive tube is pressed with the aid of a stamp in its central region until the tube or the conduit has the flattened section 12 with a substantially rectangular cross-section. The end sections 26 disposed at both sides of the flattened section 12 are not substantially deformed in this process. The component is subsequently bent forward by 90° at the left hand end of the flattened section 12, whereby the bent portion 16 is created. The flattened section 12 is then provided in the left hand region with the two right-angle folded edges 18 and in the right hand region with the flat folded edge 24 of less than 30°. In a further step, the right hand end section 26 is folded over by approximately 120°. The contact region 14 bounded by the folded edges 18 and 24 can subsequently be provided with the two bores 20. Subsequently, the two threaded pins 22 are pressed into the contact region 14.

It must be pointed out here that the contact elements such as bores, threaded pins or clinch contacts are named purely by way of example in this application.

Figure 2:
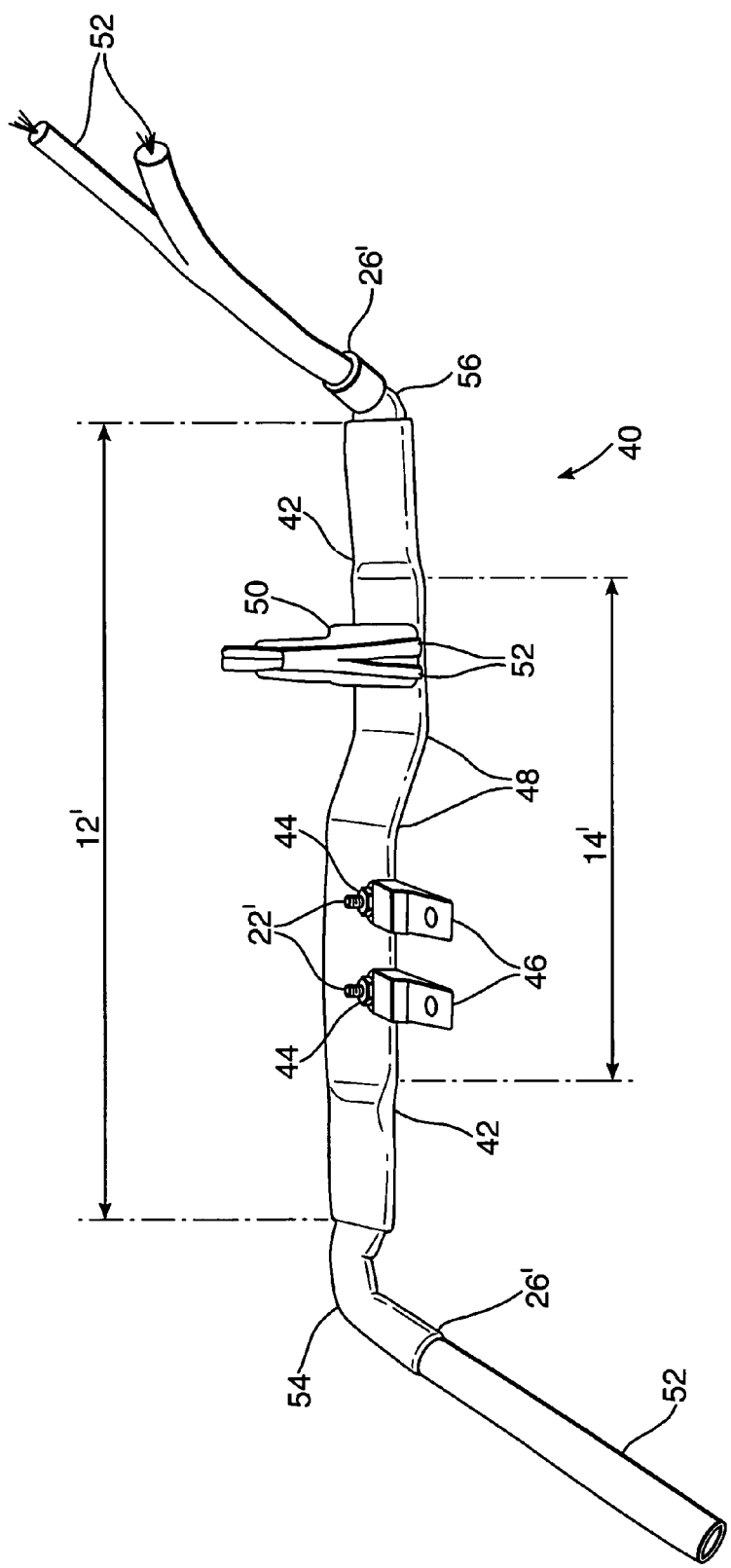
FIG. 2 is a perspective view of a further embodiment of a current distribution bus.

FIG. 2 shows a current distribution bus 40 in accordance with the invention which comprises an electrically conductive conduit which has been brought into a flattened share at least regionally by pressing and whose end sections 26' are made as electrically conductive tube pieces. The tube pieces are partially introduced into the conduit and are pressed with it into a flattened shape. The flattened section 12' of the current distribution rail 40 has bulge portions 42 toward the outer ends in the common extent of the conduit and of the tube pieces connected to the conduit. These bulge portions 42 have been created by not full pressing of the tube pieces with the conduit and serve stabilization. They also prevent the displacement of the tube pieces relative to the conduit and thus an unwanted release of the pressed connections. The bulge portions 42 bound a contact region 14'. The contact region 14' is provided in the embodiment shown with two pressed-in threaded pins 22' to which fuses 46 are fastened with nuts 44.

In the central region of the contact region 14', the extent of the current distribution bus 40 has a slope which is defined by two folded edges 48 and which includes an angle of approximately 30° with the longitudinal axis of the current distribution bus 40. The part sections of the contact region 14' extend in parallel at both sides of this slope. A contact part 50 is fastened by clinching between the slope defined by the folded edges 48 and the right hand region of the contact region 14'. The part of the contact part 50 remote from the current distribution bus is made as an open crimp barrel and fixes two electrical leads 52.

The current distribution bus in accordance with the invention furthermore comprises aforesaid end sections 26' which are made as tube pieces and are connected to the conduit by pressing. The tube piece which forms the left hand end of the current distributor rail has a bent portion 54, whereby an angle of approximately 80° results between the end section 26' and the longitudinal axis of the current distributor rail. An electrical lead 52 is fastened to the end section 26' by crimping. The tube piece forming the right hand end of the current distribution bus 40 has a folded edge 56 which forms an angle of approximately 120° between the sleeve-like end section 26' and the longitudinal axis of the current distribution bus 40. Two electrical leads 52 are fastened to this end section 26'.

To manufacture the current distribution bus 40, in a first step, straight and electrically conductive tube pieces are partly inserted into the ends of a straight and electrically conductive conduit. The tube pieces form the sleeve-like end sections 26'. The conduit and the tube pieces are then pressed with one another in their common extent, with this pressing being incomplete in the part of the common extent facing the center of the conduit. Subsequently, the central extent of the conduit bounded by the incompletely pressed regions is pressed into a flattened shape with a substantially rectangular cross-section. This part of the current distribution bus 40 represents the contact region 14'. The incompletely pressed regions disposed at both sides of the contact region 14' now form the bulge portions 42. Subsequently, the current distribution bus 40 is provided with the two folded edges 48 in its central region. In a further step, the right hand end section 26' is bent forward by approximately 80°, whereby the bent conduit portion 54 is created. Subsequently, the right hand end section 26' is folded over by approximately 120°. The contact region 14' is then provided with two threaded pins 22'. Fuses 46 are fastened to these by nuts 44. The contact part 50 is thereupon fastened by clinching between the right hand folded edge 48 and the right hand bulge portion 42 in the contact region 14'. Subsequently, electrical leads 52 are fixed to the end sections 26' and to the contact part 50 by crimping.

The invention claimed is:

1. A current distribution bus for use in motor vehicles comprising an electrically conductive conduit that has been brought into a flattened shape at least regionally by pressing and whose end sections are made in sleeve shape for the connection of electrical leads, wherein at least one end section is made as an electrically conductive tube piece that is connected to the conduit by pressing.

2. A current distribution bus in accordance with claim 1, the bus having a substantially rectangular cross-section in its flattened section.

3. A current distribution bus in accordance with claim 1, the bus being produced from a single electrically conductive tube.

4. A current distribution bus in accordance with claim 1, wherein the conduit and the tube pieces are pushed into one another and pressed into a flattened shape with one another.

5. A current distribution bus in accordance with claim 4 wherein at least one bulge portion is provided in the common extent of the conduit and of the tube pieces connected to the conduit.

6. A current distribution bus in accordance with claim 1, wherein at least one of the end sections is angled or folded over.

7. A current distribution bus in accordance with claim 1, the bus having one or more angled portions or folded edges in its flattened section.

8. A method for the manufacture of a current distribution bus in accordance with claim 3, comprising the steps of pressing an electrically conductive conduit in a central section until it has a flattened shape, without the end sections disposed at both sides of the central section being substantially deformed.

9. A method for the manufacture of a current distribution bus in accordance with claim 4, comprising the following steps: partially introducing electrically conductive, sleeve-like tube pieces and an electrically conductive conduit into one another; pressing the conduit in a central section until it has a flattened shape; and connecting the tube pieces to the conduit by pressing.

10. A method of distributing electrical current through a bus comprising the steps of providing an electrically conductive conduit that has been brought into a flattened shape at least regionally by pressing, and whose end sections are made in sleeve shape for the connection of electrical leads, wherein at least one end section is made as an electrically conductive tube piece that is connected to the conduit by pressing.

* * * * *